United States Patent [19]

Franz et al.

[11] 4,011,489

[45] Mar. 8, 1977

[54] APPARATUS FOR REGULATING MAGNETIC FLUX IN AN AC MOTOR

[75] Inventors: Joseph Phillip Franz; Allan Barr Plunkett, both of Erie, Pa.

[73] Assignee: General Electric Company, Erie, Pa.

[22] Filed: Nov. 20, 1974

[21] Appl. No.: 525,613

[52] U.S. Cl. .................. 318/227; 318/230; 318/231

[51] Int. Cl.[2] ........................ H02D 5/40

[58] Field of Search ............. 310/68, 68 C, 68 D; 318/227, 230, 231; 324/47, 117 R, 127, 158 R, 158 MG

[56] References Cited

UNITED STATES PATENTS

| | | | |
|---|---|---|---|
| 3,343,068 | 9/1967 | Keeney, Jr. et al. | 321/5 |
| 3,500,158 | 3/1970 | Landau et al. | 318/227 |
| 3,512,067 | 5/1970 | Landau | 318/227 |
| 3,593,083 | 7/1971 | Blaschke | 318/227 |
| 3,624,504 | 11/1971 | Joly | 310/68 R |
| 3,796,935 | 3/1974 | Blaschke | 318/227 |
| 3,805,135 | 4/1974 | Blaschke | 318/227 |
| 3,824,437 | 7/1974 | Blaschke | 318/227 |
| 3,855,529 | 12/1974 | Langweiler | 324/158 MG |

Primary Examiner—Robert K. Schaffer
Assistant Examiner—John J. Feldhaus
Attorney, Agent, or Firm—Walter C. Bernkopf; Albert S. Richardson, Jr.

[57] ABSTRACT

A flux sensing coil is installed in each phase of the motor stator, and the resulting induced voltages represent the rate of change of air gap flux in that phase. The output voltage signals are integrated, rectified and summed to obtain an average motor flux signal which is in turn applied to vary the voltage to the motor in such a manner as to maintain a substantially constant motor flux level. In this way control errors due to motor parameter changes are eliminated and the flux margin normally required in motor design is reduced to achieve a more efficient utilization of the motor.

29 Claims, 8 Drawing Figures

TO INTEGRATOR

APPARATUS FOR REGULATING MAGNETIC FLUX IN AN AC MOTOR

BACKGROUND OF THE INVENTION

This invention relates generally to power control circuits for induction motors and more particularly to means useful in such circuits for obtaining signals accurately representative of the motor's rotor-stator air gap flux.

In the control of traction vehicle speed, it is desirable to regulate the torque output of the system and in particular to maintain a predetermined torque capability at the output shaft of the motor. This can readily be accomplished if the rotating magnetic field strength, or the motor air gap flux level is determined. In the case of an a-c motor, as the motor speed requirements change, it is necessary to change the frequency of the power supply, and with that the amplitude of the motor excitation must be accordingly varied in order to maintain the desired flux level. Thus, there are a number of different types of voltage control systems for controlling the volts-per-hertz ratio in accordance with the particular a-c motor requirements. However, they all have certain disadvantages, among which is the necessity for a significantly large flux margin which reduces the torque efficiency of the motor. The flux margin is further increased by the control errors which are introduced by motor parameter changes (i.e. temperature, etc.). For example, in order to maintain constant flux, the motor voltage is controlled with reference to model characteristics of the motor. Since all the characteristics cannot be precisely included in the model, a margin of error will be introduced; and when the motor parameters change from the model characteristics, the margin of error will be increased.

Also when controlling voltage without reference to a model motor, the theoretical flux level for a single voltage is different for motoring and braking. During motoring the net flux is less than would ideally result from the applied voltage since there is a loss of power due to motor resistance and reactance. However, during braking where the motor acts as a generator, the opposite is true, i.e. the voltage builds up and the resulting flux is greater than would ideally be the case. Also, when braking at low speeds the IR drop causes stability problems in the system. This occurs because both the source and the motor are producing power to supply the internal motor losses.

Another requirement for voltage control systems using motor model characteristics is the requirement for an accurate knowledge of motor slip frequency. This can only be obtained by the use of a digital tachometer and digital frequency control when a low slip motor (for high efficiency) is used.

It is therefore an object of this invention to provide an a-c motor propulsion system capable of producing substantially controlled flux at variable motor speed.

Another object of this invention is the provision in an a-c motor for regulating the air gap flux at a substantially controlled value over the full load range.

Yet another object of this invention is the provision for a flux regulation system whose air gap flux level is not affected by motor parameter changes.

Still another object of this invention is the provision for an a-c motor flux regulation system which is equally effective during motoring and braking operations.

A further object of this invention is the provision for a flux regulation system that is not affected by IR drop at low speeds of operation.

Yet another object of this invention is the provision for a flux regulation system which does not require accurate knowledge of motor slip frequency.

Still another object of this invention is the provision for a flux regulation system which is economical to manufacture, simple in principle and extremely effective in use.

These objects and other features and advantages become more readily apparent upon reference to the following description when taken in conjunction with the appended drawings.

SUMMARY OF THE INVENTION

Briefly, in accordance with one aspect of the invention the flux level in the motor air gap is determined and any variation therein from a predetermined flux level causes a change in voltage which tends to maintain a desirable air gap flux level in the motor.

A flux sensing coil is placed in predetermined slots in the stator of the motor, and its output is integrated to obtain a voltage signal representative of air gap flux level. The voltage signal is then compared with a reference signal and the difference is amplified to obtain a volts-per-hertz signal, which in turn is applied to set the input voltage level to the motor.

By another aspect of the invention a multi-phase motor has a flux sensing coil in each phase and the outputs are integrated, rectified and summed to obtain an average motor flux signal which is then compared with the reference signal.

By yet another aspect of the invention plural motors are provided with flux coils, with those of the same phase connected in parallel to a common integrator for that phase. Such redundancy provides a fail-safe circuit which will continue to operate in the event one of the sensors becomes inoperative.

In the drawings as hereinafter described, a preferred embodiment is shown; however, various other modifications and alternate constructions can be made thereto without departing from the true spirit and scope of the invention.

DESCRIPTION OF THE PREFERRED INVENTION

Figure 1:
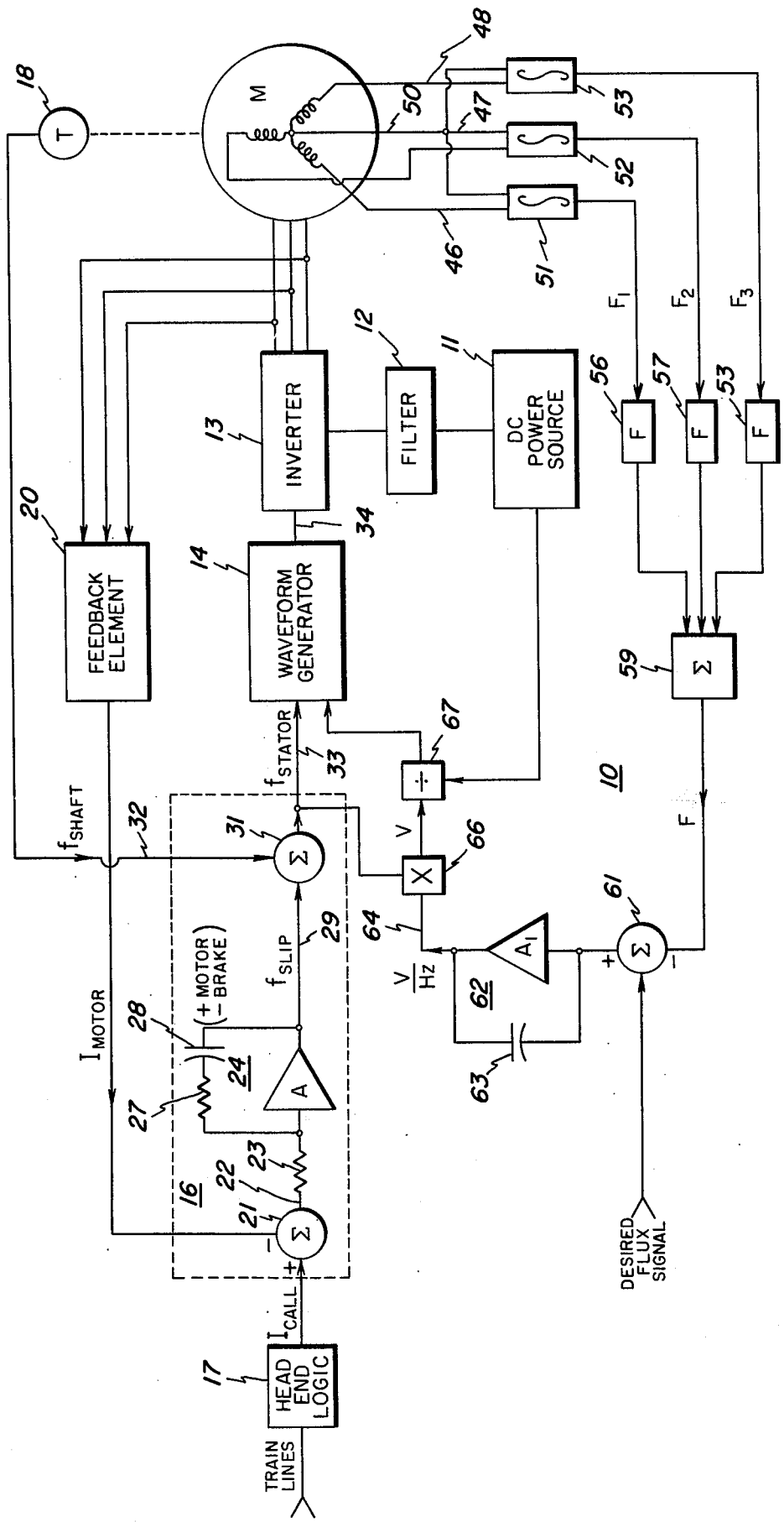
FIG. 1 is a schematic representation of the preferred embodiment of the invention.

Referring now to FIG. 1, the flux regulation control circuit of the present invention is indicated generally at 10 and forms part of the power control circuitry of a typical propulsion system having an adjustable speed a-c induction motor M which provides motive power during motoring modes of operation and which acts as a generator during dynamic braking or regenerative braking modes of operation. An alternative is to have a plurality of motors as will be more fully discussed hereinafter.

The three-phase stator windings of the a-c induction motor are excited by a controllable source of polyphase a-c electric power comprising, in combination, a d-c power source 11, a low pass line filter 12 and an inverter 13. The d-c power source is typically a third rail fed from substations supplying substantially constant d-c voltage with variable transients. The line filter 12 is utilized to minimize interference with any signalling system, to suppress d-c power source voltage transients on the inverter side of the filter, and to supply a stiff d-c voltage source for the inverter operation.

It should be understood that this invention is also applicable for use with a cycloconverter operating from an a-c source. In such a circuit the d-c power source 11, filter 12, and inverter 13 are replaced by an a-c source and a cycloconverter, with the remaining portion of the circuit operating in a manner substantially the same as with the inverter.

The inverter 13 utilizes solid state components to produce variable frequency, variable voltage, three-phase power from the d-c source to supply stator excitation to the motor for variable speed operation. In order to obtain the desired torque output values, as well as compensate for line voltage changes, load changes, and voltage drop in the cables, inverter and line filter, it is necessary to vary such excitation parameters as frequency and/or voltage amplitude. Control of the inverter to obtain the desired frequency and voltage is preferably established by a waveform generator 14 having inputs of desired stator excitation frequency, $f_{STATOR}$ from a frequency control circuit 16, and a desired stator voltage amplitude, V, from the flux regulation control circuit 10. The waveform generator is generally of the well-known type shown and described in Operational Amplifiers, Design and Application, Tobey, Graeme and Huelsman, McGraw-Hill, 1971. The output thereof is preferably a sine wave whose amplitude is determined by the input signal V, and whose frequency is determined by the input signal $f_{STATOR}$. However, various other waveforms may be generated, as for example, square or sawtooth waves.

One of the inputs into the frequency control circuit 16 is the desired motor current or $I_{CALL}$. This d-c signal is generated by the head end logic 17 which converts the trainline or controller commands to a representative current and hence, torque signal. The $I_{CALL}$ is a positive signal when operating in a motoring mode and a negative signal when operating in a braking mode. Other input signals into the frequency control circuit include a d-c feedback signal $I_{MOTOR}$, which is proportional to motor current, which is fed back from the motor; and the shaft frequency, $f_{SHAFT}$, which is fed back from the motor through the tachometer 18. A feedback element, 20 converts the three motor a-c line currents into the d-c feedback current $I_{MOTOR}$. This may be accomplished in any of a number of ways, three of which are known to use, respectively, the rectified current, real current, or compensated real current as shown and described in copending patent application Ser. No. 402,253 filed on Oct. 1, 1973, by the present inventor and assigned to assignee of the present invention (now U.S. Pat. No. 3,911,340).

Referring more specifically to the frequency control circuit 16, the desired motor current signal $I_{CALL}$ and the actual motor current signal $I_{MOTOR}$ are d-c signals which are compared in an adder 21 with the difference being transmitted along line 22 to the integrator 24. The integrator 24, comprising an operational amplifier 26 with input resistor 23, having as feedback elements resistor 27 and capacitor 28, adjusts the slip to the value required for the desired motor current and hence torque. The desired slip frequency $F_{SLIP}$ is impressed on line 29 as a positive signal when operating in the motoring mode and as a negative signal when in the braking mode of operation. In the integrator 24, the loop compensation is of the form $(S+W)/S$. The pole at the origin gives a zero steady state error and the zero $(S+W)$ allows a faster loop response for a given damping ratio.

The frequency of the alternating voltage that the inverter 13 will apply to the terminals of the stator windings of the a-c induction motor is set by the adder 31, which adds the input signals of the desired slip frequency $f_{SLIP}$, and the actual shaft frequency $f_{SHAFT}$, which is received along line 32. The desired frequency signal, $f_{STATOR}$, is thus derived by reading the shaft speed and adding (for motoring) or subtracting (for braking) the desired slip frequency $f_{SLIP}$ from the rotor frequency $f_{ROTOR}$. This function may be accomplished digitally or by analog means. It should be noted that a high degree of accuracy is not needed in the slip addition as the current feedback circuit will compensate for errors in the frequency adder, so that the tachometer 18 can be deleted without imparing the control accuracy. The frequency signal $f_{STATOR}$ is then passed along line 33 to the waveform generator 14 whose output is responsively sent along line 34 to control the inverter 13. In addition to determining the frequency of the inverter output voltage, the waveform generator 14 responds to the desired amplitude signal V to determine the amplitude of this alternating quantity.

Figure 2:
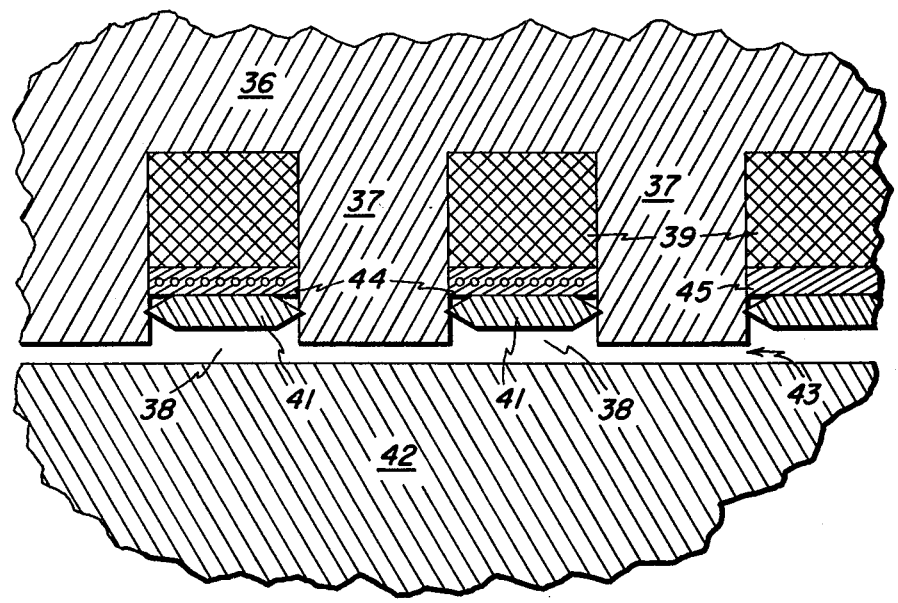
FIG. 2 is a schematic view of the stator showing the sensor installation portion of the preferred embodiment.

The desired amplitude signal V is generated by the flux control circuit 10 in which a Desired Flux Signal is compared with a feedback signal F representative of the average flux across the rotor-stator air gap of the induction motor. In accordance with the present invention, the average flux signal F is obtained by means including sensing coils actually disposed in predetermined pairs of the stator slots of the motor. This is best seen in FIG. 2 which is an enlarged cross-sectional view of a typical portion of a motor of conventional design comprising a stator 36 spaced from a rotor 42 by an air gap 43. The stator includes a plurality of teeth 37 defined by slots 38 spaced circumferentially in a surface of the stator adjacent to the air gap 43. It also includes a plurality of windings, each comprising a plurality of main coils 39 embedded in the stator slots 38 where they are secured by wedge elements 41 inserted in the same slots. The arrangement of the main coils for the respective phases of the stator windings that form each pole of the induction motor is described hereinafter in conjunction with FIG. 6. FIG. 2 shows only three stator slots centrally located in the flux belt associated with one phase of the stator windings.

Upon excitation of the stator windings by three-phase a-c electric power, the main coils 39 produce electromagnetic fluxes that cross the air gap 43 and link conductors located in slots in the outer surface of the rotor 42 of the induction motor. (The conventional rotor slots and conductors have been omitted from FIG. 2 for the sake of drawing simplicity.) In order to detect the level of flux across the air gap 43, we place a sensing coil 44 around one or more of the stator teeth 37. The flux sensing coil 44 as so located will sense the change of substantially all flux across the air gap 43 in the vicinity of the encircled tooth, and its output is a voltage proportional to the rate of change of such flux. Preferably this sensing coil takes the place of conventional slipper strips 45 of insulating material which are still used in all other slots. The coil 44 is disposed in a predetermined pair of the stator slots 38 on top of the main coils 39 that are embedded in the same pair of slots, and then the slot wedge 41 is inserted to retain the coils in their respective slots and to provide mechanical protection. The details of the coil installation will be more fully explained hereinafter.

Referring to FIG. 1 the outputs of the sensing coils are transmitted along lines 46, 47, and 48 to respective integrators 51, 52, and 53. The integrators are each connected to the coil neutral by line 50 and integrate the line-to-neutral voltage of their respective flux coil. In this way the flux level in each phase is found by integrating the voltage signals, $$emf = d/dt \, \delta_S \, \overline{B} \cdot \overline{dS}$$

where
 S = area enclosed by the line integral of the electric field
 B = magnetic flux density vector After integration we obtain the total flux, $n \, \psi = \int emf \, dt = \delta_S \, \overline{B} \cdot \overline{dS}$, for each of the phases, which we will refer to as flux signals F1, F2, and F3, respectively. These are transmitted to the respective rectifier circuits 56, 57, and 58 and the resultant absolute values are added in a summer 59 to obtain an average motor flux signal F. It should be mentioned that the above procedure assumes that (a) there is negligible leakage flux crossing the slot between the flux sensing coil and the air gap, and (b) substantially all tooth flux crosses the air gap. These assumptions need to be satisfied for accurate air gap flux regulation. If the above assumptions are not valid the voltage signal output of the sensing coil may not be directly proportional to the rate of change of flux across the motor air gap due to slot leakage flux and tooth saturation. These assumptions are substantially true in the case of an open slot stator, but cannot be safely made in the case of a motor having closed slots or a large air gap relative to the slot width. In case of a closed or semi-closed slot configuration the sensing coil should be located within close proximity of the air gap.

Returning now to the average motor flux signal, F, it is transmitted to a summing circuit 61 where it is compared with a constant value, Desired Flux Signal, with the difference being fed to the input of an integrator 62 which responsively adjusts the volts-per-hertz signal to the waveform generator. The integrator 62 comprises an operational amplifier $A_1$ with a feedback capacitor 63 and will act to maintain equality between the average flux signal F and the Desired Flux Signal by varying the $V/H_z$ signal on line 64. The flux command signal (volts/hz) is then transmitted along line 64 to a multiplier 66 where it is multiplied by the frequency $f_{STATOR}$ to obtain the motor voltage value V. The multiplier 66 is generally of a known type, as for example, a time divisional or quarter square multiplier type as shown and described in Analog Computation, Albert Jackson, McGraw-Hill, 1960. The preferred multiplier is that of the transconductance type. The multiplier 66 allows the circuit to maintain a constant loop gain as speed varies. This is not a necessary component for the operation of the voltage regulation circuit, but improves the operation considerably.

Briefly, the multiplier maintains a constant ratio of amplitude-to-frequency the alternating excitation voltage applied to the stator windings of the motor M. The result is a controlled air gap flux for operation of the motor. In addition, the cross connection of frequency variations into the voltage amplitude control channel greatly improves the stability of the motor control, especially in braking. Also, the flux signal from the voltage control channel is not required to compensate for speed changes and thus does not require fast control action.

A divider 67 is added to the inverter voltage control loop to instantaneously compensate for d-c line voltage changes while operating in the PWM mode of operation. The amplitude of the voltage applied to the motor is the product of the voltage signal, V, and the d-c line voltage. Thus, the divider is used to divide the voltage control signal by the d-c line voltage to keep the a-c motor voltage constant. The divider 67 which can be inserted either ahead of or following the multiplier as shown, is of a standard type which operates on the principles described in Analog Computation referenced hereinbefore.

Figure 3:
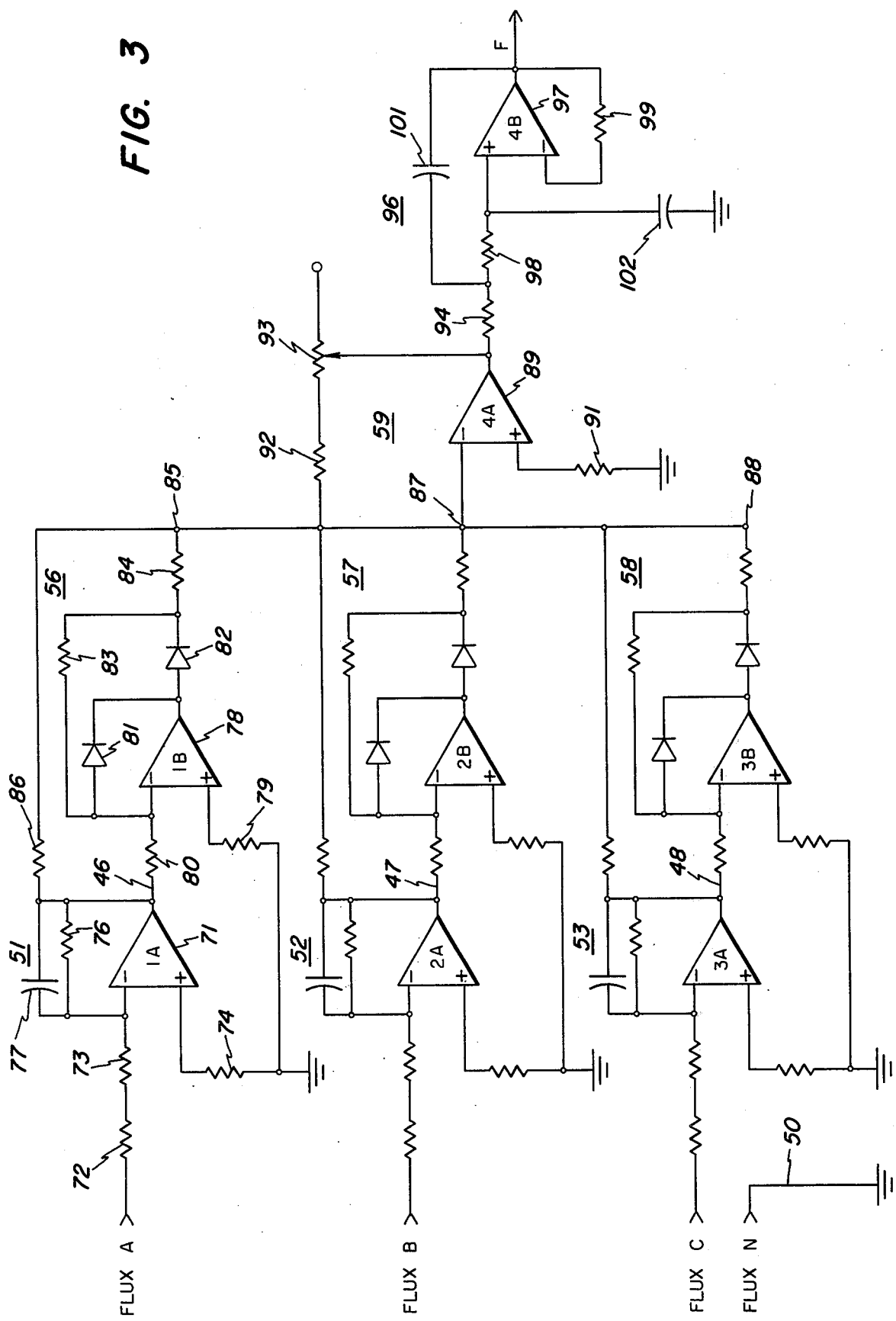
FIG. 3 is a diagram showing the preferred embodiment of the circuit that converts the sensor outputs to average flux.

The flux regulation control circuit 10 is shown in greater detail in FIG. 3 with integrators 51, 52, and 53, feeding rectifier circuits 56, 57, and 58, and the results summed in a summing circuit 59 and subsequently filtered to obtain an average flux signal F. Since the integrating and rectifying circuits are identical, only those in one phase will be described. Referring to phase A, the flux signal from the coil enters the negative input terminal of an operation amplifier 71 through input resistors 72 and 73. The positive input terminal is grounded through a bias current balancing resistor 74. The operational amplifier 71 has feedback resistor 76 and feedback capacitor 77 so that the integrator 51 is of the continuous reset type. The integrator output passes along line 46 through a resistor 80 to the negative input terminal of an operational amplifier 78 whose positive input terminal is grounded through bias current balancing resistor 79. Connected between the negative input and the output terminal is a diode 81 with its cathode next to the output terminal and a diode 82 with its anode next to the output terminal and its cathode connected to the input terminal through resistor 83. A resistor 84 is connected between the cathode of diode 82 and a junction 85, which in turn is connected to the output of operational amplifier 71 through a resistor 86. The combined operation of the integrator and rectifier circuit is such that the current at junction 85 is proportional to the absolute value of the integrator output signal and is therefore representative of total flux in that phase of the motor.

The outputs of the three circuits having common junctions 85, 87, and 88 are fed to the summer 59 comprising an operational amplifier 89 with a balancing resistor 91 and gain setting resistor 92 and 93. The summed output then passes through a resistor 94 to a two pole filter 96 which averages the sum to obtain the average flux signal F. The filter is of the form $K/(S^2 + AS + B)$ and comprises an operational amplifier 97, an input resistor 98, a bias current balancing resistor 99, a feedback capacitor 101 and a capacitor 102 between the positive input terminal and ground. The averaged output F of the filter is transmitted to the summing circuit 61 for comparison with a reference signal as mentioned hereinbefore.

Figure 4:
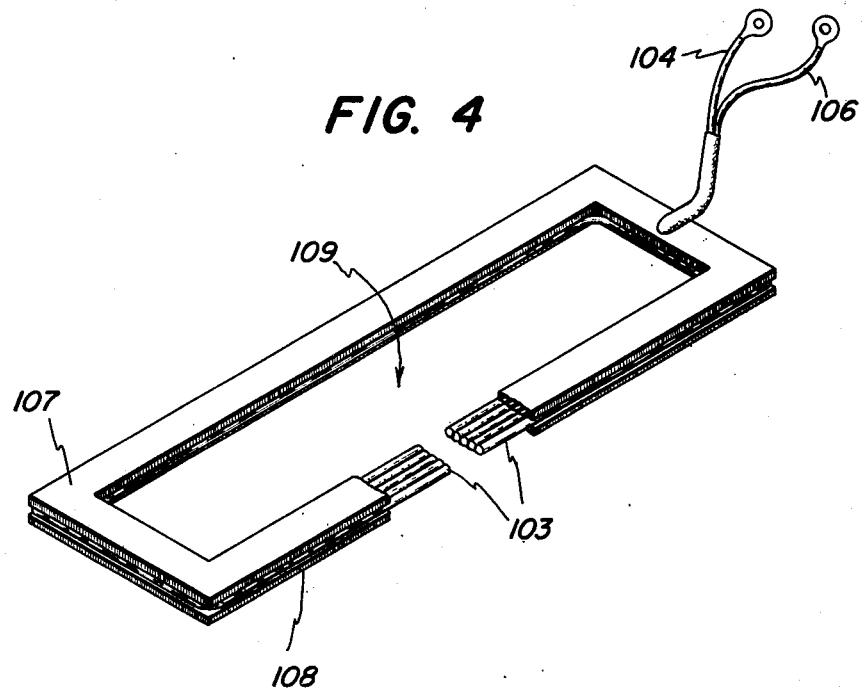
FIG. 4 is a perspective view of the flux sensing coil in accordance with the preferred embodiment of the invention.

Referring now more specifically to the mounting of the flux sensing coil 41, FIG. 4 shows the coil itself comprising a conductor wound in a plurality of turns 103 formed in a rectangular shape and terminating in two leads 104 and 106 at one end thereof. It has been found that with only a pair of turns, a buffer amplifier is required to obtain a sufficiently high level signal at low speeds. However if the number of turns is sufficient (e.g. 10 turns), then a higher level signal is received without the buffer amplifier. The maximum output voltage will depend on the tooth area enclosed by the sensing coil. The turns are disposed in a single plane and covered on each side by thin layers 107 and 108 of insulation material. This assembly has a cross sectional configuration substantially the same as that of each slipper strip 45, and it has formed therein a rectangular opening 109 into which a stator tooth 37 fits as shown in FIG. 2.

Figure 5:
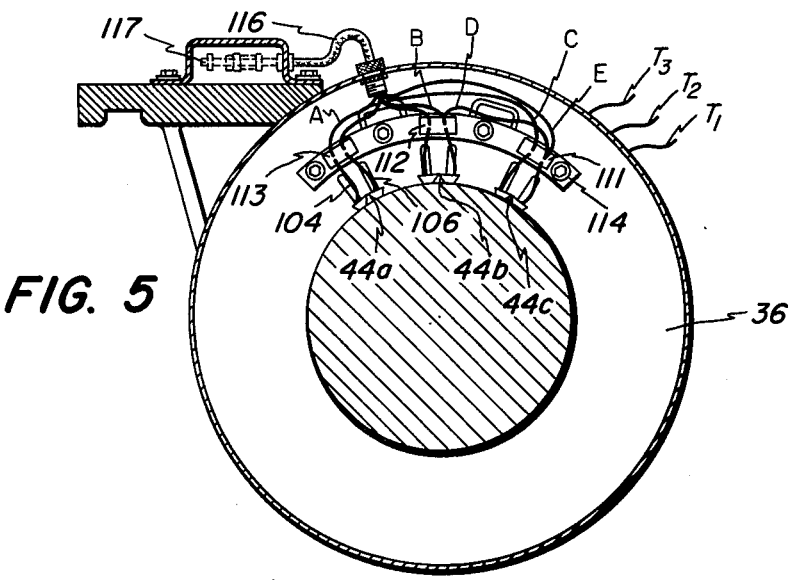
FIG. 5 is an end view of the motor stator with attachments of flux sensing coils.
Figure 7:
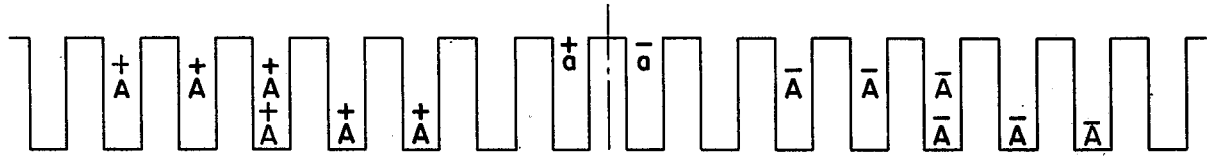
FIG. 7 is a diagram showing the winding pattern of the motor with the relative positions of the sensor coils and the main coils.
Figure 6:
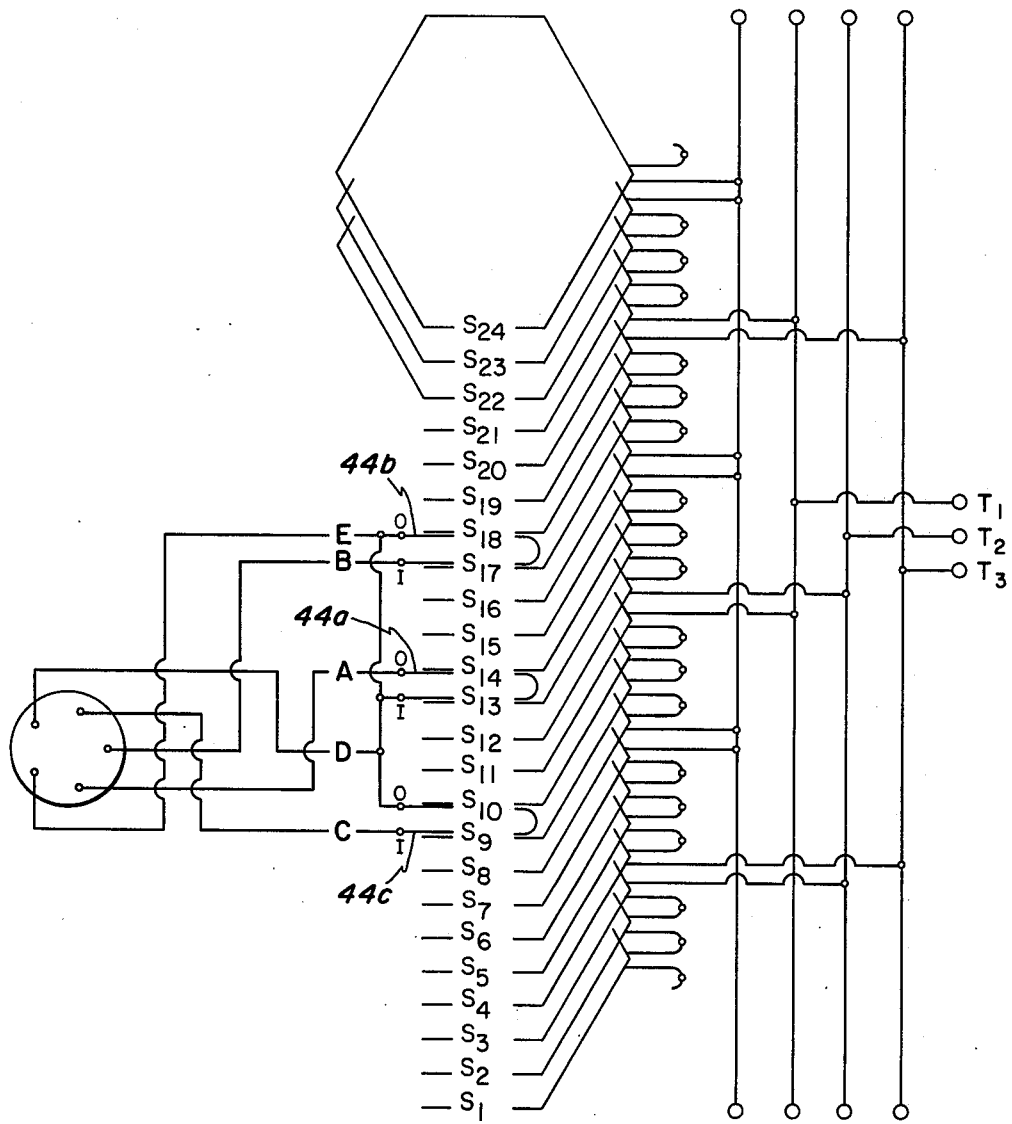
FIG. 6 illustrates an electrical schematic of a portion of the motor stator windings with included sensor windings.

Looking more closely at the installation of the flux sensor coils within the stator, FIGS. 5 and 6 show the three sensor coils 44a, 44b, and 44c as they are installed in the stator winding coils of a motor. FIG. 6 shows the main stator coils, designated by $S_1$ through $S_{24}$, for one pole pair of a four pole motor. Included are main coils for the A, B, and C phases terminating at the external leads $T_1$, $T_2$, and $T_3$. Sensor coils 44a, b and c are preferably positioned in the centers of the flux belts associated with the main coils of the respective phases of the three-phase stator windings such that the output voltage of each sensing coil is in phase with a different phase of the applied voltage when there is no rotor current (under a no load condition). This specific placement is not necessary for accomplishment of the objects of this invention; however, for purposes of using the flux signals to accomplish specific control functions not discussed in the present application, it is preferable to so locate the sensor coils in the center of their respective flux belts. That is, sensor coil 44a is placed in the same stator slots with main coils $S_{13}$ and $S_{14}$, sensor coil 44b in the same stator slots with main coils $S_{17}$ and $S_{18}$, and sensor coil 44c in stator slots 9 and 10. Referring to FIG. 7 in the preferred embodiment the centerline of the sensor coil phase a is located to correspond with the centerline of stator phase A so that the voltage rise in the phase a sensor coil is in phase with the voltage rise in phase A stator winding. It will be understood that the sensor coils for the other phases are similarly located with reference to their respective stator windings. The cable harness provides the interconnection between the coils and includes five terminal leads labeled A through E in FIG. 6. Terminal leads A, B and C, are linked to coils 44a, b and c, respectively. Terminal lead D is common to the opposite sides of the coils, and terminal lead E is connected as shielding at one end of the common line. As seen in FIG. 5 the output cable 116 is connected to the coil leads 104 and 106 by way of three terminal blocks 111, 112 and 113 mounted securely to the stator by a mounting ring 114. At its terminal end the output cable 116 goes to a bracket-mounted connection box 117 which in turn leads to the circuitry shown in FIG. 3.

It will be recognized by one skilled in the art that the sensor assembly just described may be installed with reference to any one of the poles of the motor, or if redundancy is desired, such an assembly may be installed for each of the motor poles. However, when comparing cost considerations with the advantages offered by multiple assemblies, a single assembly as shown is preferred.

Figure 8:
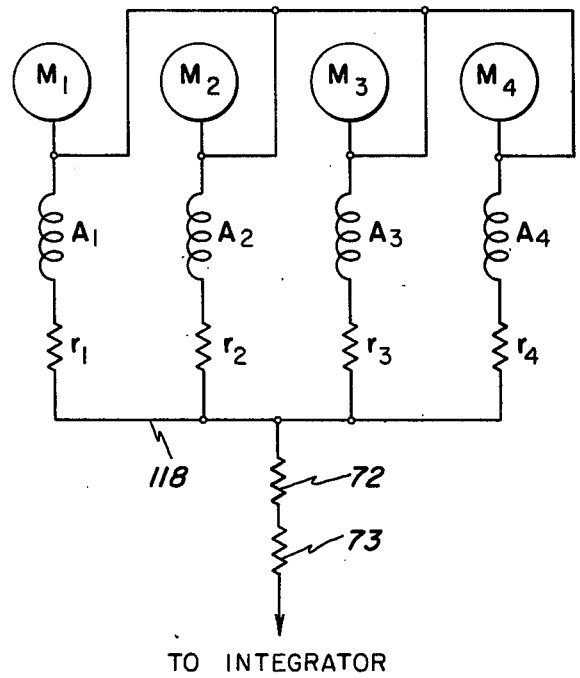
FIG. 8 is a schematic diagram of the flux sensing coils as interconnected between plural motors.

Whereas redundancy within a single motor is not particularly advantageous, it is preferred on a vehicle having a set of two or more motors excited by the same inverter power supply as is the most common arrangement. This is true since an inverter control system, in order to maintain proper control, must monitor the motor flux. If the flux regulation portion of the system fails, then the entire system becomes inoperative. For example, if a four-motor vehicle has only one of its motors containing the flux sensor assembly, and that circuit should for some reason be opened, then no flux signals would be produced and the entire system would be faulty. If on the other hand, each of the motors had such an assembly installed therein, then the failure of a single motor system would not be particularly harmful since the other motors would tend to provide the needed signals. FIG. 8 shows an interconnection scheme between motors that facilitates such a fail safe arrangement. The motors $M_1$, $M_2$, $M_3$ and $M_4$ have respective sensor coils $A_1$, $A_2$, $A_3$, and $A_4$ installed in a manner described hereinabove. Serially connected with the coil outputs are the respective small resistances $r_1$, $r_2$, $r_3$, and $r_4$ (e.g. 1000 ohms) with the individual combinations of coils and series resistances being connected in a parallel array to a common line 118. The common line 118 is then connected through input resistors 72 and 73 to the integrator for that phase as shown in FIG. 1. The combined resistances 72 and 73 are preferably substantially greater than any one of the resistances $r_1$ through $r_4$. If this is true, failure by open circuit of any of the flux coils does not significantly affect the output signal. It should be noted that in some cases the coils should not be directly paralleled to avoid excessive circulating current which could destroy the flux sensing coils under abnormal operating conditions, for example, where speed differences occur between motors.

What I claim as new and desire to secure by Letters Patent of the United States is:

1. An improved flux regulation system for an a-c motor having a stator and a rotor spaced from one another by an air gap, said stator including a plurality of teeth defined by slots in a surface of the stator adjacent to said air gap and a winding comprising a plurality of main coils embedded in said slots, the stator winding being adapted to be excited by a controllable source of electric power so as to produce electromagnetic flux across the air gap between the stator and the rotor, wherein the improvement comprises:
   a. a sensing coil placed around at least one of said teeth of the motor stator so as to have induced therein a voltage signal substantially proportional to the rate of change of flux across the air gap;
   b. means for integrating said voltage signal to obtain a signal representative of said flux; and
   c. means responsive to said representative flux signal for controlling the power source so as to vary a parameter of stator excitation in a manner that maintains a substantially controlled motor air gap flux level.

2. A flux regulation system as set forth in claim 1 wherein said sensing coil is positioned in the center of the flux belt associated with said main coils.

3. A flux regulation system as set forth in claim 1 for an a-c motor adapted to be excited by alternating voltage applied to its stator winding, wherein said variable excitation parameter is the amplitude of said alternating voltage.

4. A flux regulation system as set forth in claim 1 wherein said sensing coil is disposed in a predetermined pair of said stator slots and is proximate to but electrically insulated from the main coils that are embedded in the same pair of slots.

5. A flux regulation system as set forth in claim 4 for an a-c motor in which wedge elements are inserted in the stator slots to retain said main coils in their respective slots, wherein said sensing coil is disposed between the wedge elements and the main coils that are located in said predetermined pair of slots.

6. A flux regulation system as set forth in claim 5 wherein said sensing coil comprises a conductor wound in a plurality of turns disposed in a single plane.

7. A flux regulation system as set forth in claim 1 and including means connected to said integrating means for obtaining a signal representative of the absolute value of the flux across said air gap.

8. A flux regulation system as set forth in claim 3 and including means for comparing said representative flux signal with a desired motor flux signal and for integrating the result to obtain a volts-per-hertz signal.

9. A flux regulation system as set forth in claim 1 for a set of a-c motors excited by a common source of power wherein for each motor there is a separate sensing cell as set forth in claim 1 and a relatively small resistance connected in series therewith, the combination of sensing coil and series resistance of each motor being connected in a parallel array with the corresponding combination associated with every other motor in said set, and further including means for connecting said parallel array to said integrating means through a relatively large impedance.

10. A flux regulation system as set forth in claim 1 for an a-c motor having a stator that includes polyphase windings each comprising a plurality of main coils embedded in said stator slots, said stator windings being adapted to be excited by a controllable source of polyphase electric power, wherein there is a plurality of sensing coils respectively placed around selected stator teeth associated with the different stator windings so that each sensing coil has induced therein a voltage signal proportional to the rate of change of air gap flux produced upon excitation of the corresponding phase of the stator windings, wherein there is a plurality of means for integrating the voltage signals induced in the respective sensing coils, and further including means for rectifying and summing the integrated voltage signals to obtain a signal representative of average flux across said air gap.

11. In combination with an adjustable speed a-c motor having a stator and a rotor spaced from one another by an air gap, said stator including a plurality of teeth defined by slots in a surface of the stator adjacent to said air gap and polyphase windings each comprising a plurality of main coils embedded in said slots, the stator windings producing electromagnetic flux across the air gap between stator and rotor when excited by a polyphase a-c electric power of variable frequency and amplitude:

a. sensing coil means comprising at least one sensing coil placed around at least one stator tooth so as to have induced therein a voltage signal proportional to the rate of change of flux across the air gap between said one tooth and the rotor of the motor; and b. means for integrating said voltage signal to obtain an output signal representative of the flux sensed by said sensing coil means.

12. The combination as set forth in claim 11 wherein said sensing coil means comprises a plurality of sensing coils respectively placed around selected stator teeth of the motor.

13. The combination as set forth in claim 12 wherein said integrating means comprises a plurality of means responsive to voltage signals induced in the respective sensing coils for producing a corresponding plurality of integrated output signals representative of the air gap flux sensed by said sensing coils.

14. The combination as set forth in claim 13 wherein said selected stator teeth are respectively associated with the different stator windings of the motor so that each of said sensing coils has induced therein a voltage signal proportional to the rate of change of air gap flux produced upon excitation of the corresponding phase of the stator windings.

15. The combination as set forth in claim 14 wherein said sensing coils are respectively positioned in the centers of the flux belts associated with the main coils of said polyphase windings.

16. The combination as set forth in claim 14 and further including means for rectifying and summing said integrated output signals to obtain a signal representative of average flux across said air gap.

17. A flux regulation system for an a-c motor as set forth in claim 16, said motor being adapted to be excited by polyphase alternating voltage applied to its stator windings, comprising a combination as set forth in claim 31 and means responsive to said average flux signal for varying the amplitude of said alternating voltage to maintain a controlled air gap flux level.

18. The combination as set forth in claim 13 wherein there is a set of adjustable speed a-c motors excited by the same polyphase a-c electric power, wherein for each of said motors there is a plurality of sensing coils as set forth in claim 13 and a corresponding plurality of relatively small resistances connected in series with the respective sensing coils, wherein for each of the different phases of the excitation power the combination of sensing coil and series resistance associated with each motor is connected in a parallel array with the corresponding combination associated with every other motor in said set, and further including a corresponding plurality of relatively large impedances and means for connecting each parallel array through a different one of said large impedances to the corresponding integrated output signal producing means.

19. A flux regulation system as set forth in claim 13 and including means for varying the frequency of said alternating voltage in accordance with a desired frequency signal, wherein said amplitude varying means further includes a multiplier supplied by said volts-per-hertz signal and by said desired frequency signal, said amplitude varying means being arranged to vary the voltage amplitude in accordance with the product of said volts-per-hertz and desired frequency signals.

20. A flux regulation system as set forth in claim 5 for an a-c motor in which a plurality of insulating slipper strips are respectively disposed in stator slots other than said predetermined pair, each slipper strip being located between a main coil and a wedge element.

21. A flux regulation system as set forth in claim 20 wherein said sensing coil comprises a conductor wound in a plurality of turns disposed in a single plane and covered with insulating material to form an assembly having a cross sectional configuration substantially the same as that of each of said slipper strips.

22. The combination as set forth in claim 12 wherein at least one of said sensing coils is positioned in the center of the flux belt associated with the main coils of one of the polyphase stator windings of the motor.

23. The combination as set forth in claim 12 wherein said sensing coils are respectively disposed in predetermined pairs of said stator slots and are proximate to but electrically insulated from the main coils that are embedded in the same pairs of slots.

24. The combination as set forth in claim 23 for an a-c motor in which wedge elements are inserted in the stator slots to retain said main coils in their respective slots, wherein said sensing coils are respectively disposed between the wedge elements and the main coils that are located in said predetermined pairs of slots.

25. The combination as set forth in claim 24 wherein each of said sensing coils comprises a conductor wound in a plurality of turns disposed in a single plane.

26. The combination as set forth in claim 24 for an a-c motor in which a plurality of insulating slipper strips are respectively disposed in stator slots other than said predetermined pairs, each slipper strip being located between a main coil and a wedge element.

27. The combination as set forth in claim 26 wherein each of said sensing coils comprises a conductor wound in a plurality of turns disposed in a single plane and covered with insulating material to form an assembly having a cross sectional configuration substantially the same as that of each of said slipper strips.

28. A flux regulation system as set forth in claim 17 wherein said voltage amplitude varying means includes means for comparing said average flux signal with a desired flux signal and for integrating the result to obtain a volts-per-hertz signal.

29. A flux regulation system as set forth in claim 28 wherein said amplitude varying means is arranged to vary said voltage amplitude with said volts-per-hertz signal to maintain a substantially constant air gap flux.

* * * * *

UNITED STATES PATENT OFFICE
CERTIFICATE OF CORRECTION

PATENT NO. : 4,011,489
DATED : 3/8/77
INVENTOR(S) : Joseph P. Franz & Allan B. Plunkett It is certified that error appears in the above-identified patent and that said Letters Patent are hereby corrected as shown below:

Column 6, lines 12-13, cancel "ratio of amplitude-to-frequency" and substitute -- amplitude-to-frequency ratio of --

Column 9, line 37, delete "cell" and substitute -- coil --

Column 10, line 42, delete "31" and substitute -- 16 --

Column 10, line 62, delete "13" and substitute -- 29 --

Signed and Sealed this twelfth Day of July 1977

[SEAL]

Attest:

RUTH C. MASON
Attesting Officer

C. MARSHALL DANN
Commissioner of Patents and Trademarks